United States Patent [19]

Braudaway

[11] Patent Number: 4,907,075
[45] Date of Patent: Mar. 6, 1990

[54] METHOD FOR SELECTING COLORS

[75] Inventor: Gordon W. Braudaway, Peekskill, N.Y.

[73] Assignee: International Business Machines Corporation, Armonk, N.Y.

[21] Appl. No.: 79,078

[22] Filed: Jul. 28, 1987

[51] Int. Cl.$^4$ ............................................. H04N 1/46
[52] U.S. Cl. ..................................... 358/75; 358/81; 364/521
[58] Field of Search ....................... 358/75, 80, 81, 82, 358/903; 340/701, 703; 364/521

[56] References Cited

U.S. PATENT DOCUMENTS

| | | | |
|---|---|---|---|
| 4,646,134 | 2/1987 | Komatsu et al. | 358/11 |
| 4,689,669 | 8/1987 | Hoshino et al. | 358/80 |
| 4,710,806 | 12/1987 | Iwai et al. | 358/81 |

Primary Examiner—James J. Groody
Assistant Examiner—Robert M. Bauer
Attorney, Agent, or Firm—Terry J. Ilardi; J. David Ellett, Jr.

[57] ABSTRACT

A method for selecting a limited number of presentation colors from a larger palette for a selected image. A three dimensional color histogram of said image is generated and a first color is selected based upon the color occurring most frequently in the image. Subsequent presentation colors are selected by choosing one at a time those colors having the highest weighted frequency of occurrence wherein the weighting is such that colors closest to the previously selected color are weighted very little while colors furthest away from the previously selected color are weighted the most.

12 Claims, 4 Drawing Sheets

FIG. 6
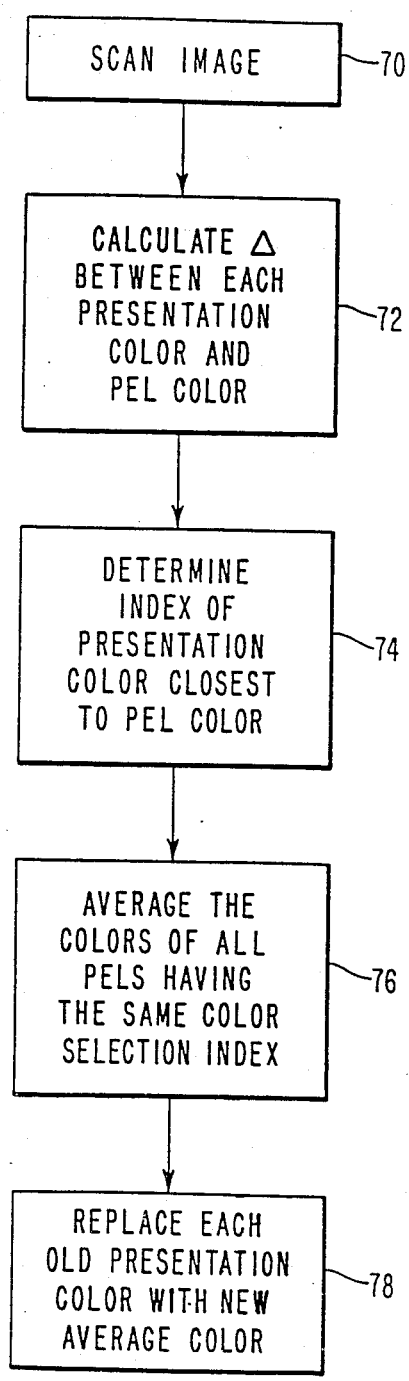
FIG. 8
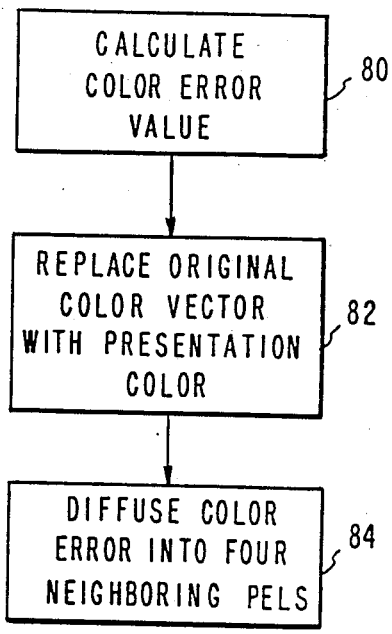
FIG. 7
| ... | XX | 7/16 |
|---|---|---|
| 3/16 | 5/16 | 1/16 |

METHOD FOR SELECTING COLORS

BACKGROUND OF THE INVENTION

1. Field of the Invention

The invention relates generally to computer displays and, more particularly, to a method for the optimum selection of a small number of colors from a large color palette for color imaging.

2. Description of the Prior Art

The use of photographic quality color images for display on a cathode ray tube device has become increasingly important for many computer applications, including those implemented for small personal computers. Most of the less expensive display devices, however, can only display a very limited number of colors at one time. This is primarily due to economics. For example, many displays assign as few as four bits per picture element (pel) which limits them to presenting no more than sixteen colors at a time. These colors are referred to as the presentation colors and are usually selected from a larger color palette. The number of distinct colors available in a color palette from which the sixteen presentation colors may be chosen can be made relatively large for a relatively small cost. This is done simply by implementing sixteen writable register sets that are selectable during each refresh cycle of the display. The color number from each pel of the image is used as a register set selector. The values from the selected register set are then routed to produce the red, green and blue CRT voltages as needed.

As the power of small computers increases, the power of imaging techniques has likewise been increased. Thus the demands for the color images displayed on a display CRT device associated with such computers has increased as well. As imaging requirements have increased so has the need to produce photographic quality images on the computer display. Heretofore, it has been difficult to provide a photographic quality image on a computer display where the number of presentation colors is limited to as few as sixteen.

The human eye, with a normal pathology, is capable of distinguishing approximately 350,000 different colors. This number has been experimentally established by direct comparison of pairs of colors placed side by side. In such experiments the viewer is asked to state whether the two colors are the same or different. Altogether, approximately 128 hues are distinguishable. Except for the spectral extreme, the wavelength of the distinguishable hues lie within three nanometers of those of their spectral neighbors. If the colors vary only in saturation, the eye can distinguish from 16 (for yellow) to 23 (for red and violet) intensity levels. All of these measurements are made using natural sunlight as illumination.

The three phosphors of color CRT's generally are not capable of producing all the hues and saturations available in natural sunlight. Thus, an approximation of the human visual limit can be produced employing no more than six bits of resolution per primary, which yield 64 discrete intensity levels per primary or 262,144 ($64^3$) distinct colors.

Clearly, in order to display a satisfactory color image on the CRT device attached to a computer, it has been necessary to compromise on the selection of which presentation colors to use to provide the most natural looking representation of, for example, a naturally occurring visual scene. It is possible to produce a natural looking image if the few presentation colors are carefully selected for a specific image.

Prior art techniques for accomplishing the digitization of a color have included a method described in "Color Image Quantization for Frame Buffer Display," P. Heckbert, *Computer Graphics,* Vol. 16, No. 3, pp. 297-307, July 1982. In the method described by Heckbert, the original image is (1) sampled for color statistics, (2) a color map is chosen based on the statistics, (3) the original colors are mapped to their nearest neighbors in the color map and (4) the original image is redrawn.

SUMMARY OF THE INVENTION

In accordance with an illustrative embodiment demonstrating objects and features of the present invention, there is provided a method for optimally selecting a limited number of colors from a larger palette to provide digitization of a color image. In the method a three dimensional color histogram is first generated having axes corresponding to red, green and blue. A first color is selected in accordance with the point having the highest value in the histogram. Thereafter colors are selected in accordance with a weighting algorithm in which points of maximum frequency in the histogram closest to the previously selected point are weighted low amounts and points of high frequency further away from the previously selected point are weighted higher amounts. After the presentation colors have been selected further optimization can be achieved using a cluster analysis technique.

It is thus an object of the present invention to provide a method for selecting colors of a color image to be presented on a computer display.

It is a further object of the present invention to select the colors in an optimum manner such that a limited number of presentation colors can be used to accurately depict a naturally occurring color image.

These and other objects, features and advantages of the present invention will be more apparent upon reference to the annexed specification and drawings.

BRIEF DESCRIPTION OF THE DRAWINGS

FIGS. 5 and 6 show flow charts that describe the present invention;

FIG. 7 shows a table of coefficients useful in color error diffusion;

FIG. 8 shows a flow chart that describes the present invention.

DETAILED DESCRIPTION OF PREFERRED EMBODIMENTS

Figure 1:
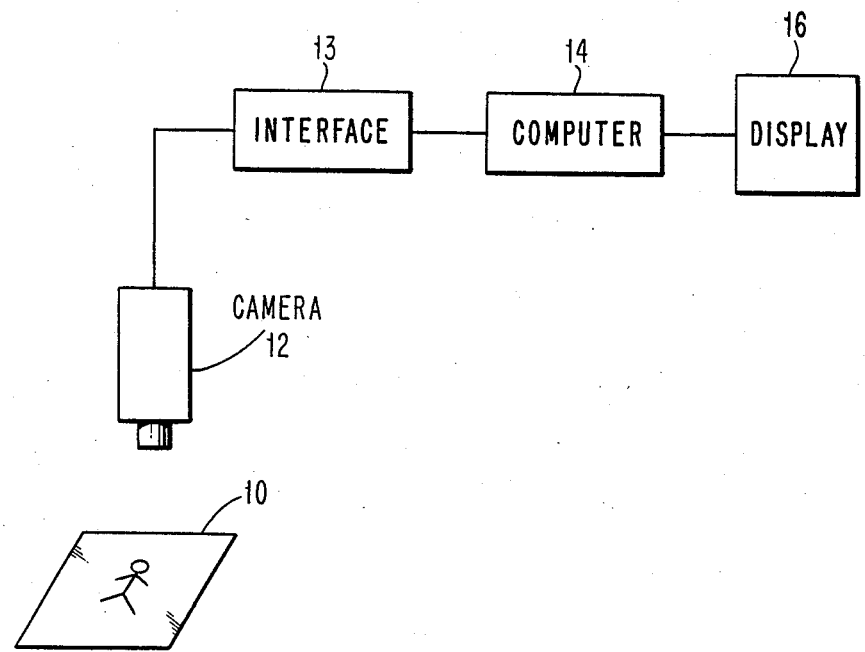
FIG. 1 shows an apparatus in which the present invention may be used.

Refer now to FIG. 1 in which a system showing the use of the present invention is shown in its simplest form. An image 10 which is to be displayed on a computer display 16 is viewed by video camera 12. Video camera 12, in turn, through appropriate hardware interface 13 provides a digitized representation of image 10. The camera 12 together with interface 13 views the image and breaks it into a predetermined number of pels. For example the image may be broken down into 640×480 pels. Based upon the colors viewed by the camera 12, interface 13 will then determine the colors for each of the individual pels. This number of colors can be significantly larger than the number of available presentation colors of the computer and its display 16. Computer 14, after execution according to the present invention selects the few presentation colors from among the many palette colors that will provide the optimum image, and these colors are stored for later usage.

Figure 2:
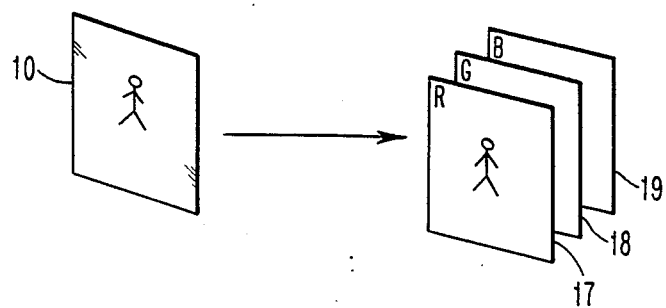
FIG. 2 shows the principle of color separation useful in explaining the present invention.

As shown schematically in FIG. 2, a conventional color separation process, using standard techniques, may be used to produce red 17, green 18 and blue 19, color separated images from color image 10. The color separated images 17, 18 and 19 contain the red, green and blue color data, respectively, of the original image.

Figure 3:
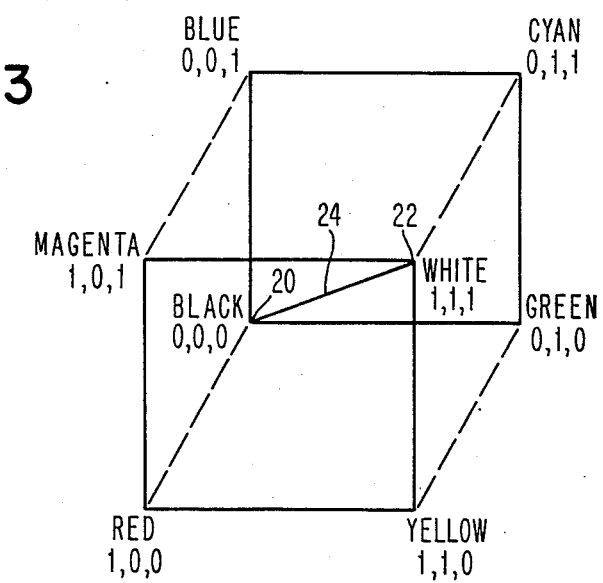
FIGS. 3 and 4 show color cubes useful in explaining the present invention.

FIG. 3 shows a "color cube" that is used to explain the method according to the present invention. Colors in the three phosphor CRT as well as the colors determined in the color separated images 17, 18 and 19 can be represented as three component vectors. It will be apparent to those of skill in the art however, that the present invention is not limited only to use in CRT displays but in any other display technology capable of presenting colors where the colors finally displayed may be considered as being comprised of color vectors having individual components. It is also clear that color components other than red, green and blue may be used.

The magnitude of each of the three vector components represents the intensity or saturation of one of the three primary phosphors colors red, green and blue. Each component can vary from 0 to 1. Referring to FIG. 3 vertex 20 includes the coordinates 0,0,0 such that when all three components are 0 the color is black. As shown at vertex 22 when all components are 1 the color is white, or more precisely that of illuminate C, where illuminate C is approximately equivalent to daylight having, by international agreement, a color temperature of 6774° Kelvin.

Each of the three color components can be considered to lay along the edge of a cube radiating and increasing in intensity from common corner 20. The three edges represent all possible shades of one of the primary colors, namely red, green and blue. The cube corner 22 diagonally opposite the black corner 20 is white. Colors lying on the diagonal 24 represent the grays, each of which is made up of equal parts of red, green and blue. Corners diagonally opposite the saturated red, green and blue corners are saturated cyan, magenta and yellow, respectively. Thus any hue or shade representable by a three phosphor system and any hue or shade appearing in a color separated image corresponds to a point within or on the edge of the color cube.

Each color image 10 to be viewed can be thought of as two dimensional array of rectangular pels, each pel having a finite size. The color associated with each pel is the average color contained in the corresponding small rectangular element of the image. The color of each pel can be decomposed or separated into an additive combination of the three primary phosphor colors as shown in FIG. 2. The intensities of the three primary colors range from zero to one. Each color-separated image can therefore be represented by three distinct two dimensional arrays 17, 18 and 19, each corresponding to one of the primary colors, red, green and blue. Each element of each array corresponds to a pel of the image. The value of each element is the magnitude of the primary component of the corresponding pel.

The entire color image may be mapped pel-by-pel into the color cube. Corresponding elements of the three arrays are the coordinates of points lying within the cube. In general, the mapping is many-to-one, that is, many pels of the image may have the same color. In the limit as the size of the pel approaches zero, the volume spanned within the color cube fuses into one or more distinct globules. Globules 30, 32 and 34 are shown in FIG. 3 and generally have irregular surfaces and may be at some distance from one another. It is a very rare image that spans the entire volume of the color cube.

Figure 4:
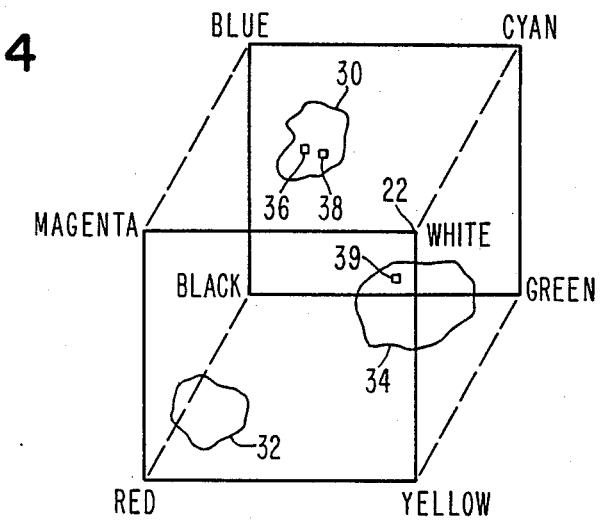

Referring to FIG. 4, as an example, a color cube is shown in which three globules are illustrated. Each of these globules is irregular in shape and encloses colors found in the image. Thus, for example, globule 30 tends toward blue, globule 32 tends towards red and globule 34 tends toward green. Each one of these globules is representative of the image, but, recalling the many-to-one mapping of the image colors into the color cube, the image cannot be recreated from the color globule representation. Each one of these globules contains points of color that appear in the image. Each point in the globule may in fact be indicative of the color of more than one image pel in the image, and if it contains information as to how many image pels it represents, it then represents a histogram of the image and shows color usage in the image.

The colors used for presentation of an image on the CRT are selected from among those contained in the corresponding color globules 30, 32 and 34. The number of distinguishable colors in an image is generally much larger then the limited number of presentation colors available. As the number of presentation colors decrease the challenge of selecting the best colors increases. For example, while a CRT may be capable of displaying up to 262,144 colors, the electronics may be implemented to display only 16 of these at any one time. Accordingly, the problem of selecting the best 16 presentation colors to represent the large number of colors appearing in any image is a non-trivial task.

Figure 5:
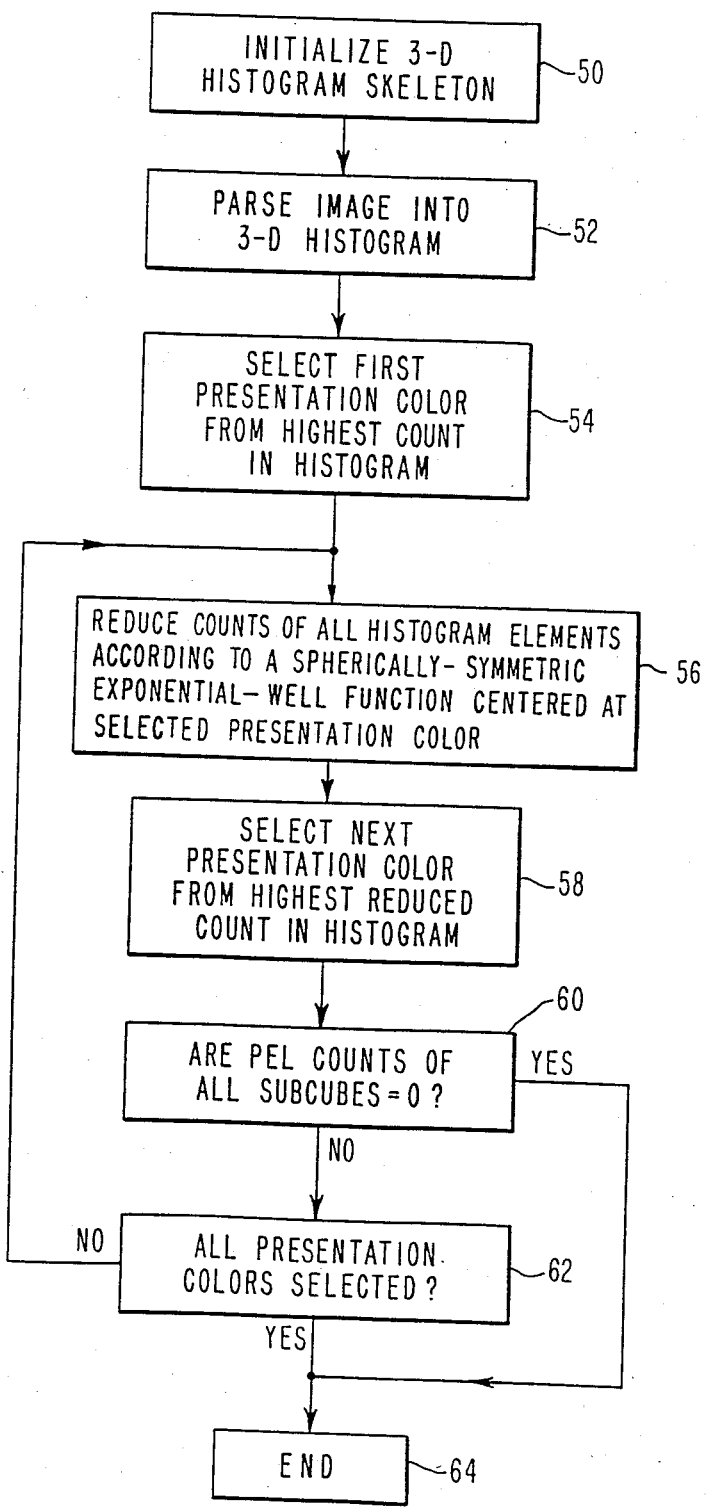

Refer now to the flow chart of FIG. 5. To begin the initial color selection process, the color cube is partitioned into 32,768 subcubes at 50. This is achieved by dividing the red, green and blue edges each into 32 uniform segments each. Each subcube is addressed as an element of a three dimensional array $C(i,j,k)$, $1 \leq i \leq 32$, $1 \leq j \leq 32$ and $1 \leq k \leq 32$ where i, j and k are associated with red, green and blue edges respectively. Increasing i, j and k corresponds to increasing primary color saturation. It will be clear however to those skilled in the art that the edges may be divided into segments other than 32 and that increasing the number of segments will increase the accuracy of the initial algorithm while also generally increasing processing time and the demand for storage.

The image is then parsed pel-by-pel at 52 and a count of the pels that lie within each subcube is accumulated in elements of the array $C(i,j,k)$. The first presentation color is then selected at 54 as that having as its components those of the centroid of the subcube having the greatest pel count. Since each subcube is generally indexed by one of its corners, using the centroid provides greater accuracy.

The process of color selection cannot be repeated without modification to find the second color. If it is, all presentation colors will likely be chosen as near neighbors of the first. Before the second color is chosen, pel counts of the neighboring subcubes must be reduced to reflect the choice of the first color. Thus it is necessary to determine the method for choosing secondary colors not generally located within the same globule as the first color. Of course it will be recognized that if an image were monochrome the second color may be one quite close to the first color. This will also be reflected in the present invention.

To prevent selection of colors on or near the first presentation color the present invention weights the selection of subsequent colors. In the present invention the weighting occurs according to an algorithm in which colors closest to the first previous point are weighted little while colors furthest from the previously selected point are weighted more. Thus referring to FIG. 4 point 36 may represent the subcube having the highest incidence in the image. Point 38 may represent the subcube of the color cube having the second highest incidence in the image. Point 39 may represent the subcube having the third highest incidence of occurrence in the image. Since subcube 38 lies so close to subcube 36 it will be given little weight whereas subcube 39 which lies a much further distance from subcube 36 will be given considerably greater weight and will be selected as the next presentation color.

At 56, the pel count is "reduced." That is, the count in each subcube in the histogram is weighted based upon its distance from the previously selected point (in this instance the first selected point).

The pel count reduction used in the present invention is a spherically symmetric exponential well centered color just chosen, of follows:

$$_{+}C(i,j,k) \rightarrow {_{-}C(i,j,k)}[1 - e^{Kr^2}]$$

where $$r^2 = (i - i_c)^2 + (j - j_c)^2 + (k - k_c)^2$$

and $i_c, j_c, k_c$ are the indices of the chosen color subcube,
$_{-}C(i,j,k)$ refers to pel counts before reduction,
$_{+}C(i,j,k)$ refers to pel counts after reduction.

It will be noted that r is the distance between corresponding corners of the subcubes, and k is a constant selected to provide good results as described below.

The exponential function has the desirable property that it can be applied uniformly to all elements of the three dimensional array. It will be apparent however to those skilled in the art that other functions may be chosen to provide the weighting.

The function presented, however, also has the needed property that the pel count of a selected color is set to 0 so it can never be selected again. This occurs since the distance of a cube from itself is 0 and thus r goes to 0. Therefore, the expression $(1 - e^{Kr^2})$ also goes to 0. If the image is composed of colors lying in only n subcubes and n is not greater than the number of choices then all subcubes will be chosen. Further all colors chosen are contained in the original image.

Experimental evaluation has shown that for many images if K is determined so that $$1 - e^{Kr^2} = 0.25$$

when $$r^2 = 8^2$$

(that is, when the distance between a color subcube centroid and the chosen color is one-fourth the length of the cube side), an adequate dispersion of initial presentation colors can be produced. It will be noted that k will have a negative value.

Following this procedure, after the first color is selected, the pel counts in all subcubes are reduced according to the formula just stated. Then the second color is selected at 58. Its components, like those of the first, are coordinates of the centroid of the subcube containing the now greatest pel count. The pel count reduction function is applied again followed by selection of the third color. The process is repeated until the necessary number of initial color choices is determined at 62 or the pel counts of all color subcubes are zero at 62. The color selection process then ends at 64. Thus each of the presentation colors is selected. In the example discussed, there are 16 possible presentation colors. For convenience, each is referred to as having an index number 1 through 16 that uniquely identifies the presentation color selected. It will be noted by those of skill in the art that any number of colors less than or greater than 16 may be chosen in the manner just described.

A mathematically defined measure of image quality, called "image entropy" is used in a final selection process. Image entropy is defined as the average magnitude of the vector difference between the pel color and the presentation color used to represent the pel. The color selection process is constructed so that image entropy is driven toward a minimum. Obviously, if the presentation colors are not changeable, as they are not in many CRT computer displays, image entropy is very high and the resulting image appears "noisy" or "blotchy" to the viewer.

A powerful statistically based algorithm exists for the minimization of image entropy. It is called a cluster analysis algorithm and has been previously described in Hartigan, J. A., "Clustering Algorithms, John New York, N.Y., 1975 and Spath, Helmuth, "Cluster Analysis Algorithms for Data Reduction and Classification of Objects", Ellis Horwood Ltd., Chichester, England, 1980. The specific local minimum to which the cluster analysis algorithm drives image entropy depends, however, on the initial estimates of the presentation colors. Starting from different initial color combinations can yield different entropy minimums, some of which produce undesirable, noisy images. Empirical evidence has shown that reliable success of entropy minimization can only be achieved from good initial color choices. Thus the algorithm used for initial color selection is key to success and without a good algorithm cluster analysis is ineffective. The heuristic algorithm previously described produces generally acceptable results.

The initial colors selected by the preceding procedure can be used for color image mapping without change. A significant reduction of image entropy, however, can be achieved by applying the cluster analysis algorithm to those choices. The cluster analysis algorithm shown in FIG. 6 is as follows:

1. The image primary color arrays are scanned pel-by-pel at 70.
2. For each pel, the vector differences between each of the presentation colors and the color of the pel is formed at 72.
3. The index of the presentation color closest to the pel color, as judged by the magnitude of the vector difference, is determined at 74 and is called the selection index for the pel.

4. A new set of presentation colors is formed by averaging the pel colors at 76 of all pels having the same selection indices.

5. Finally, at 78 each of the old presentation colors is replaced with the new average color.

This algorithm when iteratively applied converges to a set of n presentation colors that, when used as substitutes for the actual pel colors, produces an image that has minimum entropy. It must be stressed that the resulting image may or may not have the absolute minimum entropy achievable using n colors. A cluster analysis is capable of converging only to a local minimum starting from the specific initial color choices. Whether it is an absolute minimum or not depends solely on the quality of the initial color choices. In the present invention it has been found that with initial color choices determined as described above, very little image entropy improvement is achieved after two iterations of the cluster analysis algorithm.

When the final presentation colors have been selected using the cluster analysis algorithm, the original image can be remapped using those colors. This is done by replacing the color of each pel of the original image with the presentation color that lies closest to it. Closest is determined, as before, by the magnitude of the vector difference between the presentation color vector and the pel color vector. This simple substitution technique, however, often leads to undesirable effects in the remapped image. Visible color contours often develop within the image. The appearance of contouring may be reduced by the process, known in the art, of color error diffusion.

The color error diffusion process helps eliminate the "paint-by-numbers" effect, that is, where abrupt changes between adjacent regions of different colors in an image have visible boundaries. As will be described further below, however, color error diffusion is not permitted across color edges since color error diffusion across edges tends to blur the image.

Refer now to FIG. 8. To describe the diffusion process, each pel color may be represented as a three component vector $\bar{p}(l,m)$; of the original image, where m represents the image column and l represents the row in which the pel lies. Each presentation color is represented as a three-component vector $\bar{c}(l,m)$; where $k=1, \ldots n$. The diffusion process proceeds as follows:

1. For all odd values of l, the process proceeds from left to right, that is, with increasing across the image. For all even values of l the process proceeds from right to left across the image. This alternation of direction of the process serves to eliminate accumulating all the errors into one of the two bottom corners of the image.

2. For pel p(l,m), a color error vector $$\epsilon = \bar{p}(l,m) - \bar{c}(k')$$

is formed (step 80), where $\bar{c}(k')$ is the presentation color, determined as described above, lying closest to $\bar{p}(l,m)$.

3. Pel color $\bar{p}(l,m)$ is replaced by $\bar{c}(k')$ (step 82).

4. The color error is diffused into four neighboring pels using the coefficients for pel "XX" as shown in FIG. 7. (step 84) Before error diffusion into any neighboring pel is allowed, however, color edge detection is applied. It will be noted that the sum of the coefficient in FIG. 7, i.e., $7/16 + 3/16 + 5/16 + 1/16 = 1$. This permits diffusion of all the errors.

If an edge is detected, error diffusion from pel to pel is not allowed. Edge detection and diffusion are as follows:

If $|p(l,m) - p(l,m+\delta)| \leq$ $$e \text{ then } p(l,m+\delta) \leftarrow p(l,m+\delta) + \frac{7d}{16} \epsilon$$

If $|p(l,m) - p(l+1,m+\delta)| \leq$ $$e \text{ then } p(l+1,m+\delta) \leftarrow p(l+1,m+\delta) + \frac{d}{16} \epsilon$$

If $|p(l,m) - p(l+1,m)| \leq$ $$e \text{ then } p(l+1,m) \leftarrow p(l+1,m) + \frac{5d}{16} \epsilon$$

If $|p(l,m) - p(l,m-\delta)| \leq$ $$e \text{ then } p(l+1,m-\delta) \leftarrow p(l+1,m-\delta) + \frac{3d}{16} \epsilon$$

d is the color error damping parameter with domain $0 \leq d \leq 1$. If l is odd, $\delta = 1$; if l is even; $\delta = -1$.

Color error diffusion across finite color boundaries is not allowed because it causes edge blurring and a loss of image sharpness. Values of e corresponding to 1/10 of the length of the color cube side have been shown to preserve color boundary sharpness.

Color error damping does not allow the error of any particular pel to be propagated indefinitely. This sacrifices color accuracy to a small extent but tends to reduce image entropy. Values of d ranging from 0.85 to 0.95 have been shown to produce beneficial results. In effect, each coefficient in FIG. 7 is multiplied by d to reduce the coefficient.

While the invention has been described in its preferred embodiment for illustrative purposes, it will be appreciated by those of skill in the art that many additions, modifications and substitutions are possible without departing from the scope and spirit of the invention as defined in the following claims.

I claim:

1. A method for displaying a color image having a plurality of color-image colors, each of the color-image colors in the image being representable as a combination of component colors, the displayed color image being represented by a plurality of presentation colors selected from a plurality of palette colors, n designating the number of presentation colors and m designating the number of palette colors, n being less than m, the method comprising the steps of:

(a) separating the color image into component colors on a pel-by-pel basis, the color-image color of each pel being separated into component-color-intensity data representing the intensities of the component colors, the combination of such component-color-intensity data representing a palette color;

(b) generating a color histogram of the separated color image, the color histogram being associated with a color cube, each axis of the color cube representing a component color, each point in the color cube defining a color as a combination of component colors corresponding to the projection of the point on the axes of the cube, the color cube including points defining palette-color points representing the m palette-colors, the color histogram comprising a plurality of occurrence numbers, each occurrence number being associated with a palette-color point in the color cube and initially representing a number of occurrences among the pels of the separated color image of the palette color defined by the point in the color cube;

(c) selecting a presentation color from a combination of component colors having a greatest occurrence number in the color histogram to define a current-iteration selected presentation color;

(d) weighting the occurrence numbers in said histogram corresponding to palette-color points within the color cube relative to a current-iteration-selected presentation-color point corresponding to the current-iteration selected presentation color of step (c) according to the respective distances of the palette-color points from the current-iteration-selected presentation-color point, occurrence numbers corresponding to palette-color points further away from the current-iteration-selected presentation-color point being weighted more than occurrence numbers corresponding to palette-color points closer to the current-iteration-selected presentation-color point; and (e) iteratively repeating the selecting step (c) and the weighting step (d) until all of the occurrence numbers are substantially equal to zero or n presentation colors have been selected.

2. The method according to claim 1, wherein the color cube comprises a three-dimensional color cube defining three essentially mutually perpendicular axes representing respectively the colors red, green and blue.

3. The method according to claim 2, wherein the step of generating a color histogram includes dividing each axis of the color cube into a predetermined number p whereby the color cube is divided into a number $p^3$ of subcubes and each subcube corresponds to a palette-color-point of the color cube with which an occurrence number of the color histogram is associated.

4. The method according to claim 3 further comprising the step of:
remapping said selection of presentation colors using a cluster analysis.

5. The method according to claim 4 wherein said cluster analysis comprises:
determining the vector difference between each of said selected presentation colors and the color of a pel;
determining the index of said presentation color closest to said pel color in accordance with the magnitude of said vector difference; and
selecting a set of final presentation colors by averaging the pel colors of all pels having the same selection indices.

6. The method according to claim 5 wherein said weighting is made according to an exponential function.

7. The method according to claim 6 wherein said exponential function is a spherically symmetrical exponential well centered at the presentation selected color.

8. The method according to claim 5 further comprising the step of remapping said original image into said final presentation colors selection comprising the steps of:
replacing the color of each pel of said original image with said final presentation color lying closest to it wherein closeness is determined by the magnitude of the vector difference between said final presentation color and said pel color vector.

9. The method according to claim 8 wherein said mapping step further comprises error diffusion.

10. The method according to claim 9 wherein edges are detected and color diffusion is not performed across said detected edges.

11. The method according to claim 3 wherein said weighting is according to an exponential function.

12. The method according to claim 11 wherein said exponential function is a spherically symmetric exponential well function at the presentation color selected.

* * * * *